United States Patent
Meng et al.

(10) Patent No.: US 10,613,848 B2
(45) Date of Patent: Apr. 7, 2020

(54) FIRMWARE REFRESHING METHOD AND DEVICE

(71) Applicant: Xiaomi Inc., Beijing (CN)

(72) Inventors: Deguo Meng, Beijing (CN); Yue Liang, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 691 days.

(21) Appl. No.: 15/082,617

(22) Filed: Mar. 28, 2016

(65) Prior Publication Data

US 2016/0210140 A1 Jul. 21, 2016

Related U.S. Application Data

(63) Continuation of application No. PCT/CN2015/080806, filed on Jun. 4, 2015.

(30) Foreign Application Priority Data

Dec. 15, 2014 (CN) .......................... 2014 1 0778909

(51) Int. Cl.
*G06F 8/65* (2018.01)
*G06F 8/654* (2018.01)
(Continued)

(52) U.S. Cl.
CPC ............... *G06F 8/65* (2013.01); *G06F 8/654* (2018.02); *G06F 9/445* (2013.01); *G06F 9/4411* (2013.01)

(58) Field of Classification Search
CPC ............... G06F 8/65; G06F 2213/0042; G06F 11/1433; G06F 21/572; G06F 3/123; H04N 21/4126
See application file for complete search history.

(56) References Cited

U.S. PATENT DOCUMENTS 9,652,755 B2 * 5/2017 Deierling .............. G06F 21/572
2004/0093597 A1 5/2004 Rao et al.
(Continued)

FOREIGN PATENT DOCUMENTS

CN 101004691 A 7/2007
CN 101105756 A 1/2008
(Continued)

OTHER PUBLICATIONS

Combined Chinese Office Action and Search Report dated Apr. 6, 2017 in Patent Application No. 201410778909.X (with English translation of Categories of Cited Documents).
(Continued)

*Primary Examiner* — Ziaul A Chowdhury
*Assistant Examiner* — Cheneca Smith
(74) *Attorney, Agent, or Firm* — Oblon, McClelland, Maier & Neustadt, L.L.P.

(57) ABSTRACT

Aspects of the disclosure provide a method for refreshing firmware. The method can include detecting, by an electronic device in a starting stage that starts up the electronic device, another device in connection with the electronic device and that the other device requires no additional software driver. The method can further include writing a software for firmware updating from the other device into the electronic device to update a firmware on the electronic device, and executing the updated firmware when the electronic device enters a normal operation stage after a restart.

10 Claims, 5 Drawing Sheets

(51) Int. Cl.
*G06F 9/4401* (2018.01)
*G06F 9/445* (2018.01)

(56) References Cited

U.S. PATENT DOCUMENTS

| | | | |
|---|---|---|---|
| 2004/0230963 | A1 | 11/2004 | Rothman et al. |
| 2005/0188170 | A1 | 8/2005 | Yamamoto |
| 2006/0085631 | A1 | 4/2006 | Young et al. |
| 2006/0212691 | A1 | 9/2006 | Wood et al. |
| 2007/0038801 | A1 | 2/2007 | Tanaka |
| 2009/0158027 | A1 | 6/2009 | Wood et al. |
| 2009/0265736 | A1 | 10/2009 | Son |
| 2009/0293052 | A1* | 11/2009 | Kim .............. G06F 9/4411 717/174 |
| 2010/0146159 | A1 | 6/2010 | Lerman |
| 2010/0169709 | A1* | 7/2010 | Chiu .............. G06F 11/1004 714/16 |
| 2011/0040960 | A1* | 2/2011 | Deierling ........ G06F 21/572 713/2 |
| 2012/0166787 | A1 | 6/2012 | Wood et al. |
| 2012/0317404 | A1 | 12/2012 | Chou |
| 2012/0331202 | A1 | 12/2012 | Cohen et al. |
| 2013/0111201 | A1 | 5/2013 | Wood et al. |

FOREIGN PATENT DOCUMENTS

| | | | |
|---|---|---|---|
| CN | 101303674 | A | 11/2008 |
| CN | 101470610 | A | 7/2009 |
| CN | 101944029 | A | 1/2011 |
| CN | 101957765 | A | 1/2011 |
| CN | 102279756 | A | 12/2011 |
| CN | 102707960 | A | 10/2012 |
| CN | 102841801 | A | 12/2012 |
| CN | 103220330 | A | 7/2013 |
| CN | 103380415 | A | 10/2013 |
| CN | 103748569 | A | 4/2014 |
| CN | 103853638 | A | 6/2014 |
| CN | 104503786 | A | 4/2015 |
| JP | 2006-202206 | A | 8/2006 |
| JP | 2007-172391 | A | 7/2007 |
| JP | 2011-227764 | A | 11/2011 |
| JP | 2014-194682 | A | 10/2014 |
| KR | 10-2013-0022360 | A | 3/2013 |
| RU | 2 480 818 | C1 | 4/2013 |
| WO | WO2004/070571 | A2 | 8/2004 |

OTHER PUBLICATIONS

Extended European Search Report dated Jun. 7, 2016 in Patent Application No. 15199724.4.
Japanese Office Action dated Mar. 10, 2017 in Patent Application No. 2016-564376.
Korean Office Action dated Jul. 18, 2016 in Patent Application No. 10-2015-7020627.
Combine Russian Federation Office Action and Search Report dated Mar. 15, 2017 in Patent Application No. 2015129670/08(045839) (with English translation).
"USB" Interface, Dec. 1, 2014, pp. 82-93 and Cover pages.
International Search Report dated Aug. 26, 2015 in WIPO Application No. PCT/CN2015/080806.
Chinese Search Report dated Mar. 10, 2015 in Chinese Case No. PF142844CN.
Yan Qiunan, Hu Yi, Design of IAP Using SD Card Based on STM32F103VB, Technology Review, School of Instrument Science and Opto-electronics Engineering, Hefei University of Technology, Hefei 230009, China, Microcontrollers & Embedded Systems, 2012, pp. 29-31 and 39 (w/ English abstract).
Office Action dated Dec. 30, 2019 in Indian Application No. 2314/KOLNP/2015 citing reference AO (with English translation), 8 pages.

* cited by examiner

FIRMWARE REFRESHING METHOD AND DEVICE

The present application is a continuation of International Application No. PCT/CN2015/080806 with an international filing date of Jun. 4, 2015, which is based upon and claims priority to Chinese Patent Application No. 201410778909X, filed Dec. 15, 2014, the entire contents of which are incorporated herein by reference.

TECHNICAL FIELD

The present disclosure generally relates to the field of intelligent devices, and more particularly, to a firmware refreshing method and device.

BACKGROUND

Firmware, as the most fundamental software in electronic devices, guarantees normal operations of the electronic devices. However, some external causes will result in problems of the firmware and thereby influence the normal operations of the electronic devices.

When the firmware of an electronic device is problematic, special purpose refreshing tools are needed to refresh the firmware. In an example to refresh an old firmware in an electronic device, a special purpose refreshing tool is connected to the electronic device, the electronic device executes a driver program associated with the special purpose refreshing tool to read a firmware in the special purpose refreshing tool to refresh the old firmware in the electronic device.

SUMMARY

Aspects of the disclosure provide a method for refreshing firmware. The method can include detecting, by an electronic device in a starting stage that starts up the electronic device, another device in connection with the electronic device and that the other device requires no additional software driver. The method may write a software for firmware updating from the other device into the electronic device to update a firmware on the electronic device and subsequently execute the updated firmware when the electronic device enters a normal operation stage after a restart.

In an example, to detect, by the electronic device in the starting stage that starts up the electronic device, the other device in connection with the electronic device and that the other device requires no additional software driver, the method can obtain interface descriptor information of the other device that is in connection with the electronic device before the starting stage. Further, the method can include obtaining device type information of the other device when the interface descriptor information indicates that the other device is a mass storage device, and determining that the other device requires no additional software driver based on the device type information.

In an exemplary embodiment, in order to write the software for firmware updating from the other device into the electronic device to update the firmware on the electronic device, the method includes obtaining a storage address of the software stored on the other device, determining a firmware storage area in the electronic device, and writing the software stored at the storage address of the other device into the firmware storage area in the electronic device.

To obtain the storage address of the firmware stored on the other device, in an example, the method can include reading information in a specific sector of the other device, determining whether the other device employs a specific file system according to the information in the specific sector, assigning a pre-determined storage address as the storage address of the software on the other device when the other device employs the specific file system, and assigning the storage address based on meta-information carried in the information in the specific sector when the other device does not employ the specific file system, the meta-information comprising a starting address and a data length of the software.

To write the software stored at the storage address of the other device into the firmware storage area in the electronic device, in an example, the method includes replacing an existing firmware stored in the firmware storage area with the software when the firmware storage area is a single firmware storage area in the electronic device. In another example, the method includes writing the software into the firmware storage area that is set as inactive to update the firmware in the electronic device, the electronic device including at least another firmware storage area that is set as active.

Further, in an example, the method includes detecting that the software is written correctly into the firmware storage area that is set as inactive, setting the other firmware storage area to be inactive, and setting the firmware storage area to be active, the electronic device executing the updated firmware stored at the firmware storage area that is set as active when the electronic device enters the normal operation after the restart.

Aspects of the disclosure provide a firmware refreshing device that includes a device detection module, a firmware writing module, and a firmware execution module. The device detection module is configured to detect, in a starting stage, another device in connection with the electronic device, and that the other device requires no additional software driver. The firmware writing module is configured to write a software for firmware updating from the other device into the electronic device to update a firmware on the electronic device. The firmware execution module is configured to execute the updated firmware when the electronic device enters a normal operation stage after a restart.

In an example, the device detection module include a first information obtaining submodule configured to obtain interface descriptor information of the other device that is in connection with the electronic device before the starting stage, a second information obtaining submodule configured to obtain device type information of the other device when the interface descriptor information indicates that the other device is a mass storage device and a device determining submodule configured to determine that the other device requires no additional software driver based on the device type information.

According to an aspect of the disclosure, the firmware writing module includes an address obtaining submodule configured to obtain a storage address of the software stored on the other device, an area determining submodule configured to determine a firmware storage area in the electronic device and a firmware writing submodule configured to write the software stored at the storage address of the other device into the firmware storage area in the electronic device. In an example, the address obtaining submodule includes a sector information reading submodule configured to read information in a specific sector of the other device, a system judging submodule configured to determine whether the other device employs a specific file system according to the information in the specific sector, and a storage address assigning module configured to assign a pre-determined storage address as the storage address of the software on the other device when the other device employs the specific file system and to assign the storage address based on meta-information carried in the information in the specific sector when the other device does not employ the specific file system, the meta-information comprising a starting address and a data length of the software.

According to an aspect of the disclosure, the firmware writing submodule is configured to replace an existing firmware stored in the firmware storage area with the software when the firmware storage area is a single firmware storage area in the electronic device. According to another aspect of the disclosure, the firmware writing submodule is configured to write the software into the firmware storage area that is set as inactive to update the firmware in the electronic device, the electronic device including at least another firmware storage area that is set as active.

In an example, the electronic device further includes a firmware detecting module configured to detect that the software is written correctly into the firmware storage area that is set as inactive and an area setting module configured to set the other firmware storage area to be inactive and set the firmware storage area to be active, the electronic device executing the updated firmware stored at the firmware storage area that is set as active when the electronic device enters the normal operation after the restart.

Aspects of the disclosure provide an electronic device that includes an interface, a memory and a processor. The interface is configured to enable connection with the electronic device. The memory is configured to store instructions. The processor is configured to execute the instructions to detect, in a starting stage that starts up the electronic device, another device in connection with the electronic device via the interface and that the other device requires no additional software driver, write a software for firmware updating from the other device into the memory to update a firmware on the electronic device and execute the updated firmware when the electronic device enters a normal operation stage after a restart.

Exemplary aspects of the disclosure can also provide a non-transitory readable storage medium storing instructions for causing a processor to execute operations for firmware refreshing. The operations include detecting, by an electronic device in a starting stage that starts up the electronic device, another device in connection with the electronic device and that the other device requires no additional software driver, writing a software for firmware updating from the other device into the electronic device to update a firmware on the electronic device, and executing the updated firmware when the electronic device enters a normal operation stage after a restart.

It should be understood that both the foregoing general description and the following detailed description are exemplary and explanatory only, and are not in any way restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Through the above accompany drawings, the specific embodiments of the present disclosure have been shown, for which a more detailed description will be given as below. These drawings and textual description are not intended to limit the scope of the concept of the present disclosure in any manner, but to explain the concept of the present disclosure to those skilled in the art through particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The firmware refreshing methods provided by respective embodiments of the present disclosure can be realized by an electronic device having firmware refreshing function. The electronic device can be a smart phone, an intelligent TV, a tablet computer, an e-book reader, an MP3 (Moving Picture Experts Group Audio Layer III) player, an MP4 (Moving Picture Experts Group Audio Layer IV) player, or the like.

For the purpose of simplifying description, the present disclosure will be described with an example where the firmware refreshing method is applied in an electronic device, and however, the present disclosure is not limited to this.

Figure 1:
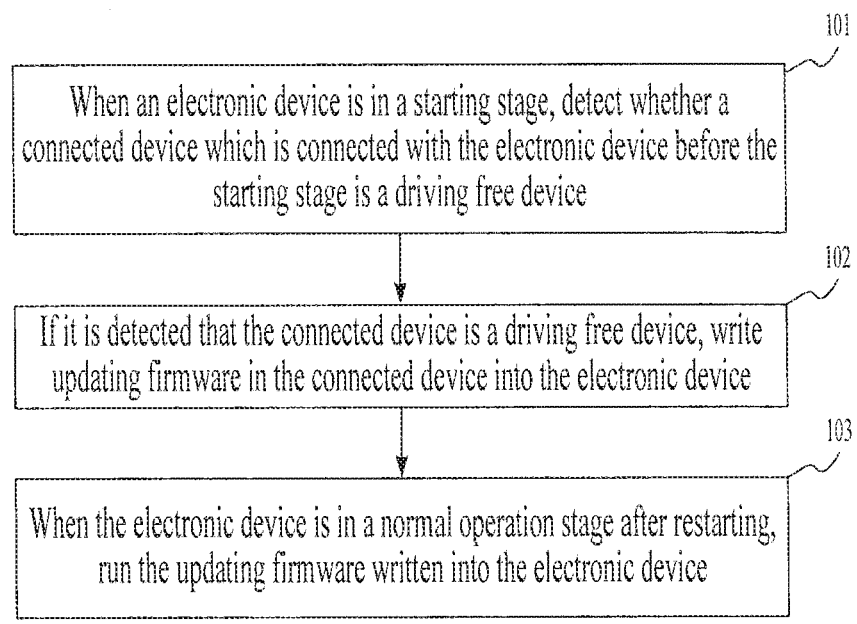
FIG. 1 is a flowchart showing a firmware refreshing method according to an exemplary embodiment of the present disclosure.

FIG. 1 is a flowchart showing a firmware refreshing method according to an exemplary embodiment. The firmware refreshing method can be applied in an electronic device and can include the following steps.

In step 101, when the electronic device is in a starting stage, the electronic device detects whether another device in connection with the electronic device requires specific driver program. The other device can be referred to as a connected device. In an example, when the connected device does not require specific driver program, the connected device is called a driving free device. In an embodiment, the other device is connected with the electronic device before the starting stage.

In step 102, when the connected device requires no specific driver program, a software program stored in the other device that is in connection with the electronic device is written into the electronic device to update the firmware of the electronic device. In an example, the software program is a firmware for the electronic device. The software program can be the same version as the present firmware for the electronic device and used to repair the firmware in the electronic device, and can be a different version from the present firmware for the electronic device to upgrade the firmware in the electronic device. In the example, the software program can be referred to as an updating firmware.

In step 103, when the electronic device is in a normal operation stage after a restart, the electronic device executes the updated firmware.

In an example, to detect whether the other device in connection with the electronic device is a driving free device, the electronic device can obtain interface descriptor information of the other device which is connected with the electronic device before the starting stage. When the interface descriptor information indicates that the other device is a mass storage device, the electronic device can obtain device type information of the other device. In an example, when the device type information indicates that a device type of the connected device is supported by existing drivers in the electronic device and does not require specific driver program that is not supported, the electronic device determines that the connected device is the driving free device.

In an example, to write the updating firmware from the connected device into the electronic device, the electronic device can obtain a storage address of the updating firmware from the connected device, determine a firmware storage area in the electronic device and write the updating firmware stored at the storage address of the connected device into the firmware storage area of the electronic device.

In an example, to obtain the storage address of the updating firmware from the connected device, the electronic device can read information in a particular sector of the connected device, and determine whether the connected device employs a specific file system according to the information in the particular sector. When the electronic device determines that the connected device employs a specific file system, the electronic device can assign a pre-determined storage address as the storage address of the updating firmware. When the electronic device determines that the connected device does not employ the specific file system, the electronic device can assign the storage address of the updating firmware according to meta-information carried in the information in the particular sector. In an example, the meta-information includes a starting address and a data length of the updating firmware.

In an example, to write the updating firmware stored at the storage address of the connected device into the firmware storage area of the electronic device, the electronic device can replace previous firmware stored in the firmware storage area with the updating firmware when the electronic device has one firmware storage area.

In another example, the electronic device includes at least two firmware storage areas, such as a first firmware storage area and a second firmware storage area. One of the first and second firmware storage areas is set as active, and other firmware storage areas is set as inactive. When the electronic device operates in a normal stage, the electronic device executes the firmware that is stored at a firmware storage area that is active, and does not execute the firmware that is stored at a firmware storage area that is set as inactive. For example, at a time, the first firmware storage area is set as active and the second firmware storage area is set as inactive. In this example, the electronic device can write the updating firmware into the second firmware storage area that is inactive. Further, the electronic device can detect whether the updating firmware is written correctly into the firmware storage area that is inactive, such as the second firmware storage area. When the updating firmware is correctly written into the second firmware storage area in the example, the electronic device can set the first firmware storage area which is previously active into inactive, and set the second firmware storage area that stores the updating firmware as active. Then, when the electronic device enters a normal operation stage, the electronic device can execute the updated firmware stored at the second firmware storage area.

To sum up, in the firmware refreshing method provided by the present embodiment, when an electronic device is in a starting stage, whether a connected device which is connected with the electronic device before the starting stage is a driving free device is detected: if it is detected that the connected device is a driving free device, updating firmware in the connected device is written into the electronic device: and when the electronic device is in a normal operation stage after restarting, the updating firmware written into the electronic device is executed. Thus, even if there is no corresponding driving program for driving a special purpose refreshing tool to refresh the firmware in the electronic device is installed in the electronic device, firmware refreshing of the electronic device can be completed by the driving free device, which solves the problem that when no corresponding driving program is installed in an electronic device, the firmware in the special purpose refreshing tool cannot be read and thereby the refreshing of the firmware will fail. Consequently, the firmware refreshing procedure is simplified and the success rate of firmware refreshing can be improved.

Figure 2:
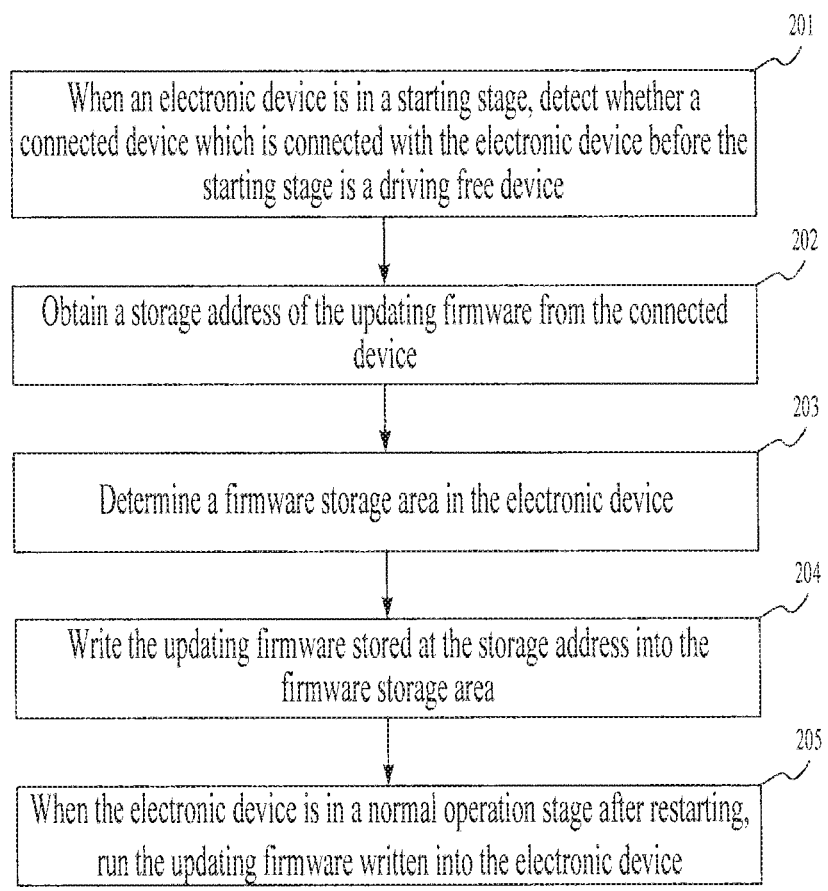
FIG. 2 is a flowchart showing a firmware refreshing method according to another exemplary embodiment of the present disclosure.

FIG. 2 is a flowchart showing a firmware refreshing method according to another exemplary embodiment. The firmware refreshing method can be applied in an electronic device and can include the following steps.

In step 201, when an electronic device is in a starting stage that starts up the electronic device (e.g., when the electronic device is powered up), whether a connected device which is connected with the electronic device before the starting stage is a driving free device is detected.

In an example, before an electronic device is powered up, another device is connected to the electronic device via an interface provided by the electronic device, such as an interface for coupling external device with the electronic device. The other device can be called as a connected device, and the interface can be called external interface. The external interface can be any suitable interface, such as a Universal Serial Bus (USB) interface on the electronic device, a dock connector, and the like. In an example, the electronic device is a mobile device, such as a smartphone, a tablet, and the like that does not have a USB interface, the electronic device is equipped with a dock connector that is used to interface accessory devices, such as external speaker, a dock device and the like. Further, in the example, the dock device can include a USB interface.

Generally, the electronic device is equipped with existing driver programs that can drive devices coupled with the interface. In an example, the electronic device can be equipped with an existing driver program for USB mass storage device, such that the electronic device can recognize a USB mass storage device.

In the example, after the electronic device and the other device are suitably connected, the electronic device is powered up and enters a starting stage. In the starting stage, the electronic device detects whether any device is connected. When the electronic device detected that another device is connected, the electronic device detects whether the connected device is a driving free device. In an example, a driving free device is referred as a device that can be driven by existing driver programs on the electronic device and does not need additional specific driver programs to be installed on the electronic device. In an example, to detect whether the connected device is a driving free device, the electronic device can obtain interface descriptor information of the connected device which is connected with the electronic device before the starting stage.

The interface descriptor information of the connected device is configured to indicate functions of the connected device. The electronic device determines which driving program needs to be loaded to drive the connected device by obtaining the interface descriptor information. The interface descriptor information includes base type of an interface, subclass type of the interface and an interface protocol. The electronic device respectively obtains the base type of the interface, the subclass type of the interface and interface protocol information in the interface descriptor information by interface enumeration. For example, by the interface enumeration, the electronic device obtains the following information: the base type of the interface of the connected device: USB_CLASS_MASS_STORAGE; the subclass type of the interface of the connected device: USB_SCSI; and the interface protocol: USB_PR_BULK.

Then, when the interface descriptor information indicates that the connected device is a mass storage device, the electronic device obtains device type information of the connected device.

In an example, the electronic device recognizes the interface descriptor information obtained in the interface enumeration procedure. When the interface descriptor information indicates that the connected device is a mass storage device, the electronic device further obtains device type information of the connected device. The device type information can be obtained by sending a Small Computer System Interface (SCSI) acquiring instruction from the electronic device.

For example, the electronic device obtains the following interface descriptor information of the connected device: the base type of the interface: USB_CLASS_MASS_STORAGE; the subclass type of the interface: USB_SCSI; and the interface protocol: USB_PR_BULK, and then the electronic device can determine that the connected device is a mass storage device. The electronic device sends an SCSI acquiring instruction, receives return value, and uses the obtained return value as the device type information of the device.

When the device type information indicates that a device type of the connected device is a driving free type, the electronic device determines that the connected device is the driving free device.

A correspondence relationship between return values and device types can be preset. For example, after the electronic device sends an SCSI acquiring instruction, the electronic device receives a return value: 0x00. According to the correspondence relationship and the return value, the electronic device can determine that the connected device is a U-disk which belongs to a driving free type (e.g., can be driven by existing driver programs on the electronic device and requires no additional specific driver program), and thus the electronic device can determine that the connected device is a driving free device.

According to an example, the electronic device can also detect whether the connected device is for updating firmware. For example, the device type information of the connected device can have a bit that is used for indicating the whether the connected device is for updating firmware. Based on the device type information, the electronic device can detect whether the connected device is for updating firmware, and then can operate accordingly.

In step 202, the electronic device obtains a storage address of the updating firmware from the connected device.

Because the connected device is a driving free device, the electronic device can read updating firmware stored in the connected device without use of particular driving program. It is noted that different connected devices can employ different types of file systems and storage addresses of updating firmware in the different connected devices can be different. To read the updating firmware, the electronic device needs to determine the storage address of the updating firmware according to the type of the file system of the connected device. In an example, to determine the storage address, the electronic device reads information in a particular sector of the connected device. Information in particular sectors can have different storage formats associated with different file systems, and thus the electronic device can determine the file system of the connected device by reading information in a particular sector of the connected device. It is noted that, the electronic device usually reads the information in the first sector in the connected device.

Then the electronic device judges whether the connected device employs a particular file system according to the information in the particular sector.

In an example, the electronic device stores a correspondence relationship table between information in particular sectors and types of file systems in advance. Based on the correspondence relationship table, the electronic device determines the type of the file system employed by the connected device according to the read information in the particular sector. The correspondence relationship table that shows the correspondence relationship between information in particular sectors and types of file systems can be exemplified as Table 1.

TABLE 1

| Information in particular sectors | File systems |
| --- | --- |
| Information stored in format A | A file system |
| Information stored in format B | B file system |
| Information stored in format C | C file system |

In an example, the different file systems can use different storage address for the updating firmware. The storage addresses associated with the different file systems can be predetermined and stored in the electronic device. When the electronic device determines that the connected device employs a particular file system, the electronic device can assign a preset storage address associated with the particular file system as the storage address of the updating firmware.

In an example, the electronic device stores the storage addresses associated with file systems in a table format. The correspondence relationship between file systems and storage addresses of updating firmware can be exemplified as Table 2.

TABLE 2

| File system | Storage address of updating firmware |
| --- | --- |
| A file system | Storage address A |
| B file system | Storage address B |
| C file system | Storage address C |

The preset storage address can be a storage path in the connected device. For example, the preset storage address can be "H:/firmware" which indicates that the storage address of the updating firmware is a firmware file under a root directory of H disk.

Different file systems can correspond to different or the same storage addresses of the updating firmware, and the present embodiment is described with the example where different file systems correspond to different storage addresses of the updating firmware, and however, the present disclosure is not limited to this.

Further, when the electronic device detects that the connected device does not employ any particular file system, such as any file system in Table 2, the electronic device determines the storage address of the updating firmware according to meta-information carried in the information in the particular sector. For example, the meta-information includes a starting address and a data length of the updating firmware.

Specifically, in an example, the electronic device searches file system in a table, such as Table 2, according to the read information in the particular sector. When the electronic device cannot find the file system corresponding to the read information in the table, the electronic device determines that the connected device does not employ any particular file system in the table. The electronic device can, according to the meta-information included in the information in the particular sector, obtain the starting address and the data length of the updating firmware included in the meta-information and determine the storage address of the updating firmware.

In step 203, a firmware storage area in the electronic device is determined.

In an example, the information of the firmware storage area in the electronic device is stored in the meta-information in an internal memory, such as an internal flash memory, the electronic device can read the meta-information in the internal flash memory and determine the firmware storage address for storing the updating firmware. The firmware storage area is configured to store firmware.

In an example, the electronic device includes one firmware storage area. The firmware storage area is configured to store the firmware executed by the electronic device when the electronic device is in a normal operation stage. In another example, the electronic device includes at least two firmware storage areas. One of the firmware storage areas is set as an active area, and the firmware storage area set as an active area is configured to store the firmware executed by the electronic device when the electronic device is in a normal operation stage. Other firmware storage area(s) is(are) set as an inactive area, and the firmware storage area(s) set as an inactive area is(are) configured to store firmware which is not executed by the electronic device when the electronic device is in the normal operation stage.

In the example that the electronic device has one firmware storage area, the electronic device can read the meta-information in the internal flash memory, and can determine the firmware storage area in the electronic device as the firmware storage area for storing the updating firmware. In the example, the electronic device has multiple firmware storage areas, the electronic device can determine the firmware storage area set as an inactive area in the electronic device as the firmware storage area for storing the updating firmware.

There is no strict sequence limitation on steps 202 and 203, and the present embodiment is described with an example where step 202 is performed before step 203, and however, the present disclosure is not limited to this.

In step 204, the electronic device writes the updating firmware stored at the storage address of the connected device into the firmware storage area of the electronic device.

It is noted that the manners for writing the updating firmware into different firmware storage areas can be different. The present embodiment is described respectively with the above-discussed two examples to explain the procedure for writing the updating firmware.

In the example that the electronic device includes only one firmware storage area, the electronic device replaces a previous firmware stored in the firmware storage area with the updating firmware.

Specifically, in the example that the electronic device includes only one firmware storage area, the electronic device reads the updating firmware in the connected device, and writes the updating firmware into the firmware storage area and stores the updating firmware to replace the previous firmware stored in the firmware storage area with the updating firmware. In an example, in order to guarantee the correctness of the updating firmware, the electronic device needs to further detect whether the updating firmware is written correctly into the firmware storage area. The electronic device can detect whether the updating firmware is correctly written according to check values stored in a preset position. The check values can be stored at the head or the tail of the updating firmware. For example, the electronic device obtains the check values from the head of the updating firmware, and performs Cyclic Redundancy Check (CRC) on the written updating firmware using the check values, and determines whether the updating firmware is correctly written into the storage firmware storage area according to the check results.

After writing the updating firmware from the connected device into the firmware storage area in the electronic device, the electronic device issues prompting information to prompt the user completion of the writing of the updating firmware and to prompt the user to disconnect the connected device and restart the electronic device. The prompting information can be voice information or text information.

In the example that the electronic device includes at least two firmware storage areas, the electronic device writes the updating firmware into one of the firmware storage areas which is set as an inactive area. The firmware storage area set as an inactive area is configured to store firmware which is not executed by the electronic device when the electronic device is in the normal operation stage.

For example, when the electronic device has a first firmware storage area and a second firmware storage area, one of the firmware storage areas, for example the first firmware storage area, is a firmware storage area set as an active area, and the other one of the firmware storage areas, for example the second firmware storage area, is a firmware storage area set as an inactive area. The electronic device writes the updating firmware stored in the connected device into the second firmware storage area set as an inactive area.

Further, in an example, the electronic device can detect whether the updating firmware is written correctly into the firmware storage area set as an inactive area, for example the second firmware storage area. Then, when the electronic device detected that the updating firmware is correctly written into the second firmware storage area set as an inactive area, the electronic device can set, for example the first firmware storage area which is previously set as an active area into an inactive area, and set the second firmware storage area into which the updating firmware is correctly written as an active area. Then, when the electronic device is in the normal operation stage, the electronic device executes the firmware stored at the second firmware storage area that is set as active.

In order to guarantee the correctness of the updating firmware, the electronic device can detect whether the updating firmware is correctly written according to the check values stored in the preset position. The check values can be stored at the head or the tail of the updating firmware. For example, the electronic device obtains the check values from the head of the updating firmware, and performs CRC on the written updating firmware using the check values, and determines whether the updating firmware is correctly written into the storage firmware storage area according to check results.

When it is detected that the updating firmware is correctly written and can be executed correctly, the electronic device can set the inactive area as an active area. In order to guarantee that only one active area exists in the electronic device, the electronic device needs to set the previously set active area as an inactive area. After completion of the setting, the electronic device can issue prompting information to prompt the user the completion of writing of the updating firmware and to prompt the user to disconnect the connected device and restart the electronic device.

The electronic device can remain the firmware in the inactive area and can delete or replace the firmware, and the present disclosure does not impose specific limitations on this.

In step 205, when the electronic device is in a normal operation stage after a restart, the electronic device executes the updating firmware written in the electronic device.

When the electronic device is in a starting stage, whether a device is connected with the electronic device is detected. When no device is detected as connected to the electronic device, the electronic device enters into a normal operation stage, and executes the updating firmware written into the firmware storage area and thereby firmware updating is realized. When it is detected that there is a device connected with the electronic device, the electronic device performs steps 201 to 204.

To sum up, in the firmware refreshing method provided by the present embodiment, when an electronic device is in a starting stage, whether a connected device which is connected with the electronic device before the starting stage is a driving free device is detected; if it is detected that the connected device is a driving free device, updating firmware in the connected device is written into the electronic device; and when the electronic device is in a normal operation stage after restarting, the updating firmware written into the electronic device is run. Thus, even if there is no corresponding driving program is installed in the electronic device, firmware refreshing of the electronic device can be completed by the driving free device, which solves the problem that when no corresponding driving program is installed in an electronic device, the firmware in the special purpose refreshing tool cannot be read and thereby the refreshing of the firmware will fail. Consequently, the firmware refreshing procedure is simplified and the success rate of firmware refreshing can be improved.

Further, the electronic device detects whether the connected device employs a particular file system; when the connected device employs a particular file system, the electronic device obtains the updating firmware from a preset storage position; when the connected device does not employ a particular file system, the electronic device obtains the updating firmware according to the meta-information carried in the information in the particular sector. Thus, the electronic device can read the updating firmware from different file systems. Consequently, the success rate of firmware refreshing can be improved and the application range of the firmware refreshing can be extended.

Further, the electronic device detects whether the updating firmware is correctly written into the firmware storage area set as an inactive area; if it is detected that the updating firmware is correctly written into the firmware storage area set as an inactive area, the electronic device sets the firmware storage area as an active area; and if it is detected that the updating firmware is correctly written, the electronic device sets the inactive area as the active area. Thus, the normal running of the written updating firmware is guaranteed.

Embodiment of devices in the present disclosure which can perform the embodiments of the methods of the present disclosure will be described as follows. For the undisclosed details of the embodiments of the devices, the embodiments of the methods of the present disclosure can be referred to.

Figure 3:
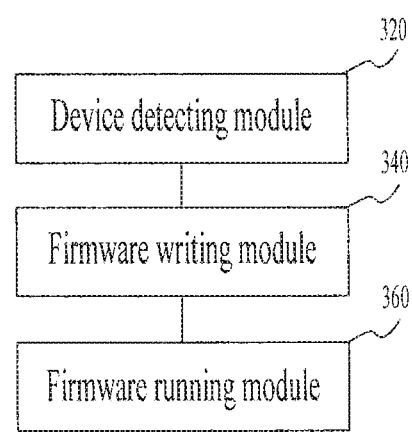
FIG. 3 is a structure block diagram showing a firmware refreshing device according to an exemplary embodiment.

FIG. 3 is a structure block diagram showing a firmware refreshing device according to an exemplary embodiment. The firmware refreshing device can be realized as a part or whole of an electronic device, and can be realized by software, hardware or combination thereof. The firmware refreshing device can include a device detecting module 320, a firmware writing module 340 and a firmware running module 360.

The device detecting module 320 is configured to, when the electronic device is in a starting stage, detect whether a connected device which is connected with the electronic device before the starting stage is a driving free device. In an example, the device detecting module 320 is implemented as processing circuitry executing software instruction.

The firmware writing module 340 is configured to, if the device detecting module 320 detects that the connected device is a driving free device, write updating firmware in the connected device into the electronic device. In an example, the firmware writing module 340 is implemented as processing circuitry executing software instruction.

The firmware running module 360 is configured to, when the electronic device is in a normal operation stage after restarting, execute the updating firmware written by the firmware writing module 340 into the electronic device. In an example, the firmware running module 340 is implemented as processing circuitry executing software instruction.

To sum up, in the firmware refreshing device provided by the present embodiment, when the electronic device is in a starting stage, whether a connected device which is connected with the electronic device before the starting stage is a driving free device is detected; if it is detected that the connected device is a driving free device, updating firmware in the connected device is written into the electronic device; and when the electronic device is in a normal operation stage after restarting, the updating firmware written into the electronic device is run. Thus, even if there is no corresponding driving program is installed in the electronic device, firmware refreshing of the electronic device can be completed by the driving free device, which solves the problem that when no specific driver program associated with a special purpose refreshing tool is installed in an electronic device, the firmware in the special purpose refreshing tool cannot be read and thereby the refreshing of the firmware will fail. Consequently, the firmware refreshing procedure is simplified and the success rate of firmware refreshing can be improved.

Figure 4:
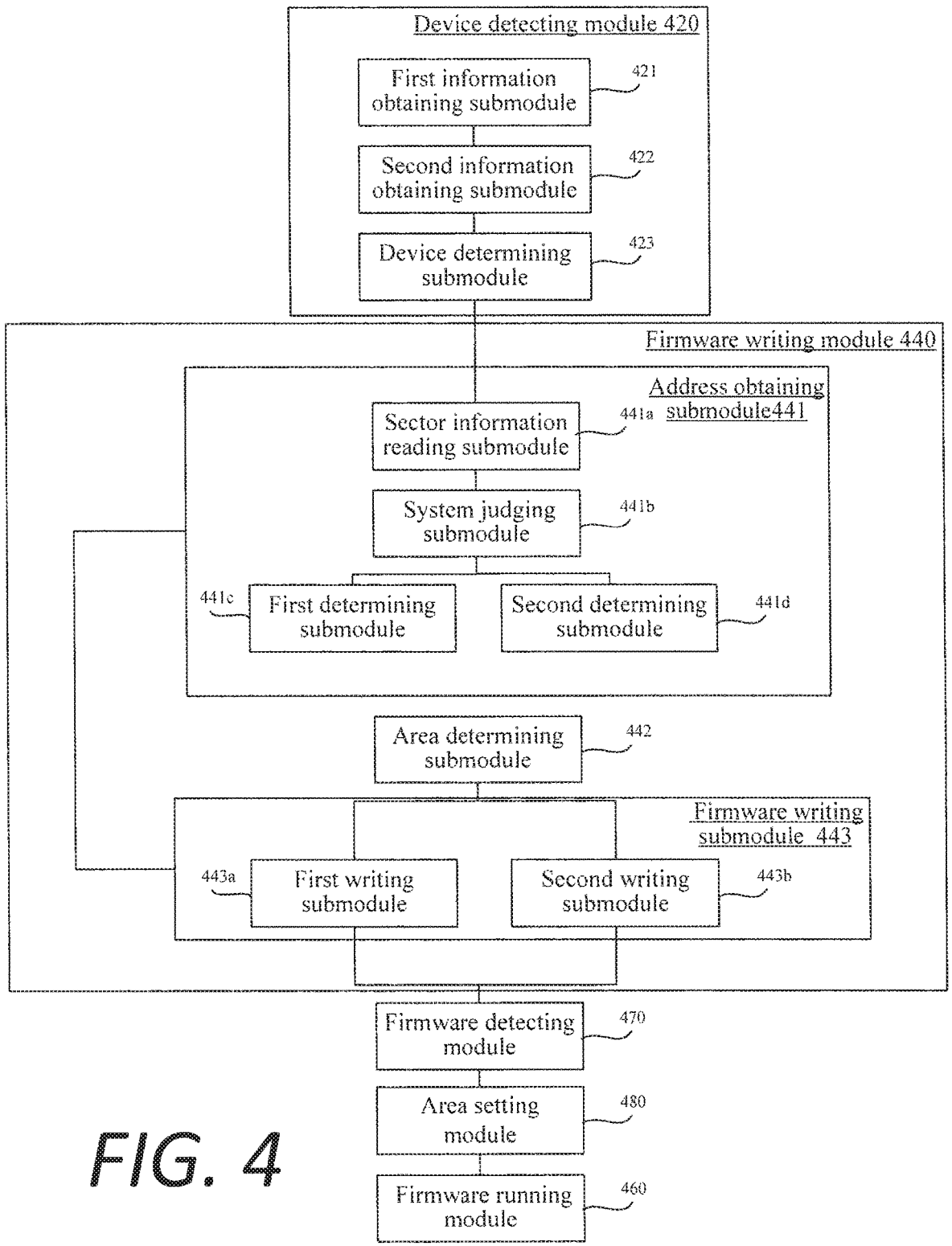
FIG. 4 is a structure block diagram showing a firmware refreshing device according to an exemplary embodiment.

FIG. 4 is a structure block diagram showing a firmware refreshing device according to another exemplary embodiment. The firmware refreshing device can be realized as a part or whole of an electronic device, and can be implemented by software, hardware or combination thereof. The firmware refreshing device can include a device detecting module 420, a firmware writing module 440 and a firmware running module 460.

The device detecting module 420 is configured to, when an electronic device is in a starting stage, detect whether a connected device which is connected with the electronic device before the starting stage is a driving free device.

The firmware writing module 440 is configured to, if the device detecting module 420 detects that the connected device is a driving free device, write updating firmware from the connected device into the electronic device.

The firmware running module 460 is configured to, when the electronic device is in a normal operation stage after restarting, execute the updating firmware written by the firmware writing module 440 into the electronic device.

In an example, the device detecting module 420 includes a first information obtaining submodule 421, a second information obtaining submodule 422 and a device determining submodule 423.

The first information obtaining submodule 421 is configured to obtain interface descriptor information of the connected device which is connected with the electronic device before the starting stage.

The second information obtaining submodule 422 is configured to, when the interface descriptor information obtained by the first information obtaining submodule 421 indicates that the connected device is a mass storage device, obtain device type information of the connected device.

The device determining submodule 423 is configured to, when the device type information obtained by the second information obtaining submodule 422 indicates that a device type of the connected device is a driving free type, determine that the connected device is the driving free device.

Further, in an example, the firmware writing module 440 includes an address obtaining submodule 441, an area determining submodule 442 and a firmware writing submodule 443.

The address obtaining submodule 441 is configured to obtain a storage address of the updating firmware from the connected device.

The area determining submodule 442 is configured to determine a firmware storage area in the electronic device.

The firmware writing submodule 443 is configured to write the updating firmware stored at the storage address obtained by the address obtaining submodule 441 into the firmware storage area determined by the area determining submodule 442.

Further, according to an aspect of the disclosure, the address obtaining submodule 441 includes a sector information reading submodule 441a, a system judging submodule 441b, a first determining submodule 441c and a second determining submodule 441d.

The sector information reading submodule 441a is configured to read information in a particular sector of the connected device.

The system judging submodule 441b is configured to judge whether the connected device employs a particular file system according to the information in the particular sector obtained by the sector information reading submodule 441a.

The first determining submodule 441c is configured to, if the system judging submodule 441b judges that the connected device employs a particular file system, determine a preset storage address as the storage address of the updating firmware.

The second determining submodule 441d is configured to, if the system judging submodule 441b judges that the connected device does not employ a particular file system, determine the storage address of the updating firmware according to meta-information carried in the information in the particular sector, the meta-information comprising a starting address and a data length of the updating firmware.

According to an aspect of the disclosure, the firmware writing submodule 443 includes a first writing submodule 443a and a second writing submodule 443b.

The first writing submodule 443a is configured to, when there is one firmware storage area included in the electronic device, replace initial firmware stored in the firmware storage area with the updating firmware.

The second writing submodule 443b is configured to, when there are at least two firmware storage areas included in the electronic device, write the updating firmware into a firmware storage area which is set as an inactive area, the firmware storage area set as an inactive area being configured to store firmware which is not run in the electronic device.

According to an aspect of the disclosure, the device further includes a firmware detecting module 470 and an area setting module 480.

The firmware detecting module 470 is configured to detect whether the updating firmware is written correctly into the firmware storage area set as an inactive area.

The area setting module 480 is configured to, if the firmware detecting module 470 detects that the updating firmware is correctly written into the firmware storage area set as an inactive area, set a firmware storage area which is previously set as an active area into an inactive area, and set the firmware storage area into which the updating firmware is correctly written as an active area, the firmware storage area set as an active area being configured to store firmware run by the electronic device when the electronic device is in a normal operation stage.

To sum up, in the firmware refreshing device provided by the present embodiment, when an electronic device is in a starting stage, whether a connected device which is connected with the electronic device before the starting stage is a driving free device is detected; if it is detected that the connected device is a driving free device, updating firmware in the connected device is written into the electronic device; and when the electronic device is in a normal operation stage after restarting, the updating firmware written into the electronic device is run. Thus, even if there is no corresponding driving program is installed in the electronic device, firmware refreshing of the electronic device can be completed by the driving free device, which solves the problem that when no corresponding driving program is installed in an electronic device, the firmware in the special purpose refreshing tool cannot be read and thereby the refreshing of the firmware will fail. Consequently, the firmware refreshing procedure is simplified and the success rate of firmware refreshing can be improved.

Further, the electronic device detects whether the connected device employs a particular file system; when the connected device employs a particular file system, the electronic device obtains the updating firmware from a preset storage position; when the connected device does not employ a particular file system, the electronic device obtains the updating firmware according to the meta-information carried in the information in the particular sector. Thus, the electronic device can read the updating firmware from different file systems. Consequently, the success rate of firmware refreshing can be improved and the application range of the firmware refreshing can be extended.

Further, the electronic device detects whether the updating firmware is correctly written into the firmware storage area set as an inactive area; if it is detected that the updating firmware is correctly written into the firmware storage area set as an inactive area, the electronic device sets the firmware storage area as an active area: and if it is detected that the updating firmware is correctly written, the electronic device sets the inactive area as the active area. Thus, the normal running of the written updating firmware is guaranteed.

It is noted that any one of the modules or submodules in the FIG. 4 example can be implemented as hardware, software, or a combination of hardware and software. In an example, each of the modules or submodules in the FIG. 4 example is implemented as processing circuitry executing software instructions.

An exemplary embodiment of the present disclosure further provides a firmware refreshing device, the firmware refreshing device can be implemented in an electronic device having a firmware refreshing function. The firmware refreshing device includes an interface for connecting external devices, a processor, and a memory for storing instructions executable by the processor. In the embodiment, the processor is configured to perform when the electronic device is in a starting stage, detecting whether a connected device which is connected with the electronic device before the starting stage is a driving free device. If the processor detects that the connected device is a driving free device, the processor is configured to perform writing updating firmware in the connected device into the electronic device. When the electronic device is in a normal operation stage after a restart, the processor is configured to perform executing the updating firmware written in the electronic device.

In an example, to detect whether a connected device which is connected with the electronic device before the starting stage is a driving free device, the processor is configured to perform obtaining interface descriptor information of the connected device which is connected with the electronic device before the starting stage. When the interface descriptor information indicates that the connected device is a mass storage device, the processor is configured to perform obtaining device type information of the connected device. When the device type information indicates that a device type of the connected device is a driving free type, the processor is configured to perform determining that the connected device is the driving free device.

In an example, to write updating firmware in the connected device into the electronic device, the processor is configured to perform obtaining a storage address of the updating firmware from the connected device, determining a firmware storage area in the electronic device, and writing the updating firmware stored at the storage address into the firmware storage area.

In an example, to obtain a storage address of the updating firmware from the connected device, the processor is configured to perform reading information in a particular sector of the connected device, and judging whether the connected device employs a particular file system according to the information in the particular sector.

If it is judged that the connected device employs a particular file system, the processor is configured to perform determining a preset storage address as the storage address of the updating firmware.

If it is judged that the connected device does not employ a particular file system, the processor is configured to perform determining the storage address of the updating firmware according to meta-information carried in the information in the particular sector. In an example, the meta-information includes a starting address and a data length of the updating firmware.

In an example, to write the updating firmware stored at the storage address into the firmware storage area, the processor is configured to perform, when there is one firmware storage area included in the electronic device, replacing initial firmware stored in the firmware storage area with the updating firmware. Further, the processor is configured to perform, when there are at least two firmware storage areas included in the electronic device, writing the updating firmware into a firmware storage area which is set as an inactive area. The firmware storage area that is set as an inactive area is configured to store firmware which is not executed in the electronic device when the electronic device is in the normal operation mode.

Further, in an example, the processor is configured to perform detecting whether the updating firmware is written correctly into the firmware storage areas set as an inactive area. If it is detected that the updating firmware is correctly written into the firmware storage area set as an inactive area, the processor is configured to set a firmware storage area which is previously set as an active area into an inactive area, and set the firmware storage area into which the updating firmware is correctly written as an active area. The firmware storage area set as an active area is configured to store firmware executed by the electronic device when the electronic device is in a normal operation stage.

To sum up, in the firmware refreshing device provided by the embodiment, when an electronic device is in a starting stage, whether a connected device which is connected with the electronic device before the starting stage is a driving free device is detected; if it is detected that the connected device is a driving free device, updating firmware in the connected device is written into the electronic device; and when the electronic device is in a normal operation stage after restarting, the updating firmware written into the electronic device is run. Thus, even if there is no corresponding driving program is installed in the electronic device, firmware refreshing of the electronic device can be completed by the driving free device, which solves the problem that when no corresponding driving program is installed in an electronic device, the firmware in the special purpose refreshing tool cannot be read and thereby the refreshing of the firmware will fail. Consequently, the firmware refreshing procedure is simplified and the success rate of firmware refreshing can be improved.

For the devices in the above embodiments, the specific operations performed by respective modules have been described in the method embodiments in detail and the description thereof is not elaborated here.

Figure 5:
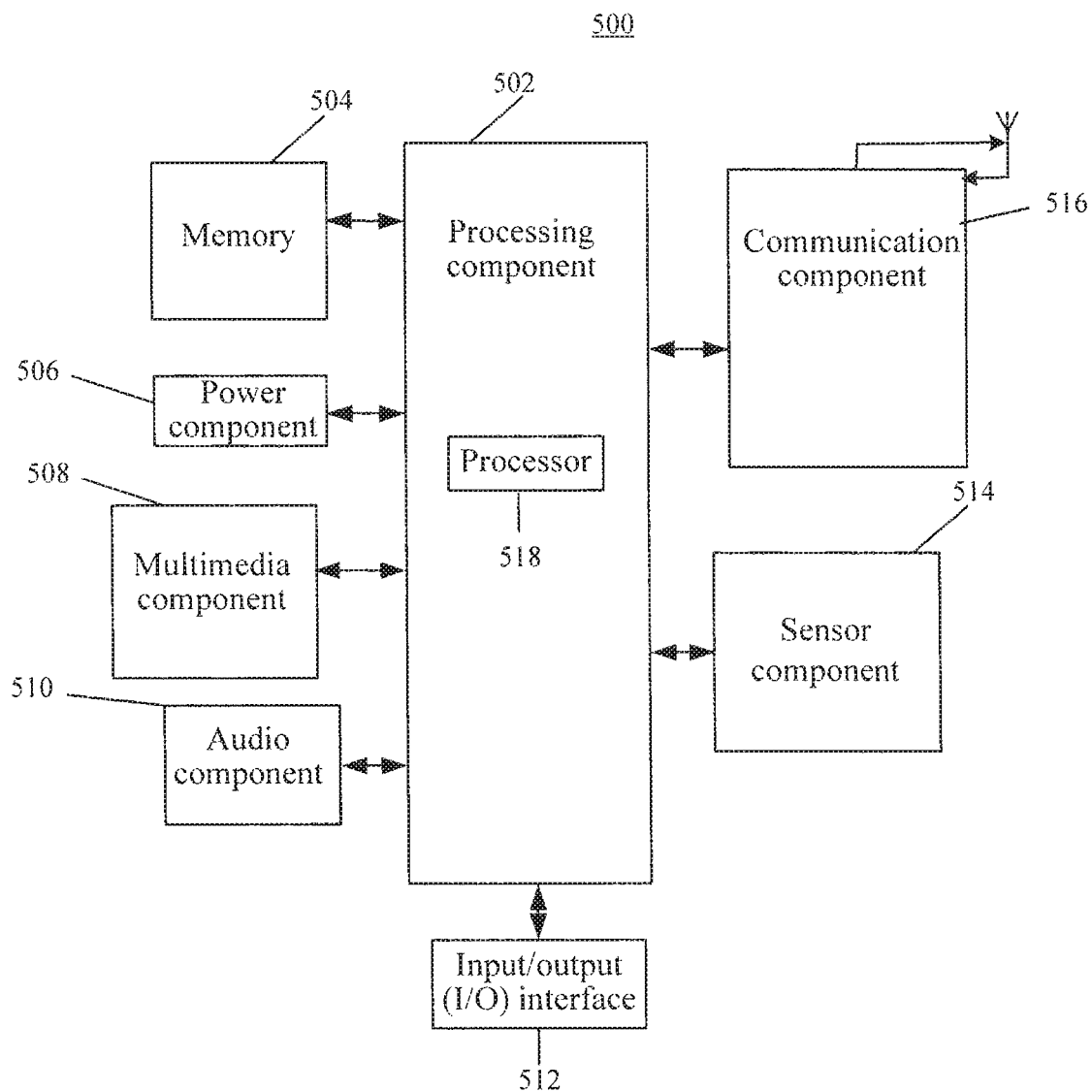
FIG. 5 is a structure block diagram showing a firmware refreshing device according to an exemplary embodiment.

FIG. 5 is a structure block diagram showing a firmware refreshing device 500 according to an exemplary embodiment. For example, the device 500 can be an electronic device having a firmware refreshing function.

Referring to FIG. 5, the device 500 can include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 can include one or more processors 518 to execute instructions to perform all or part of the steps in the above described methods. Moreover, the processing component 502 can include one or more modules which facilitate the interaction between the processing component 502 and other components. For instance, the processing component 502 can include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, and the like.

The power component 506 provides power to various components of the device 500. The power component 506 can include a power management system, one or more power sources, and any other components associated with the generation, management, and distribution of power in the device 500.

The multimedia component 508 includes a screen providing an output interface between the device 500 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 508 includes a front camera and/or a rear camera. The front camera and the rear camera can receive an external multimedia datum while the device 500 is in an operation mode, such as a photographing mode or a video mode. Each of the front camera and the rear camera can be a fixed optical lens system or have focus and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal can be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons can include, but are not limited to, a home button, a volume button, a starting button, and a locking button. In an example, the I/O interface 512 includes a USB interface. In another example, the I/O interface 512 includes a dock connector.

The sensor component 514 includes one or more sensors to provide status assessments of various aspects of the device 500. For instance, the sensor component 514 can detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 can include a proximity sensor configured to detect the presence of nearby objects without any physical contact. The sensor component 514 can also include a light sensor, such as a CMOS or CCD image sensor, for use in imaging applications. In some embodiments, the sensor component 514 can also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 500 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method.

In exemplary embodiments, there is also provided a non-transitory computer-readable storage medium including instructions, such as included in the memory 504, executable by the processor 518 in the device 500, for performing the above-described methods. For example, the non-transitory computer-readable storage medium can be a ROM, a RAM, a CD-ROM, a magnetic tape, a floppy disc, an optical data storage device, and the like.

An non-transitory computer-readable storage medium, when instructions in the storage medium are executed by a processor of the device 500, the device 500 is enabled to perform the firmware refreshing method applied in an electronic device having a firmware refreshing function.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for refreshing firmware, comprising:
   detecting, by an electronic device in a starting stage that starts up the electronic device, an external device in connection with the electronic device, wherein the external device is a driving free device that does not require any driver to drive the external device, and wherein detecting the external device includes:
      obtaining interface descriptor information of the external device that is in connection with the electronic device before the starting stage;
      obtaining device type information of the external device when the interface descriptor information indicates that the external device is a mass storage device; and
      determining that the external device requires no software driver based on the device type information;
   determining, based on the interface descriptor information, a driver that needs to be loaded on the electronic device for firmware updating, wherein the driver is stored in the external device;
   writing software for firmware updating from the external device into the electronic device to update a firmware on the electronic device without use of the driver by:
      obtaining a storage address of the software stored on the external device;
      determining a firmware storage area in the electronic device; and
      writing the software stored at the storage address of the external device into the firmware storage area in the electronic device that is set as inactive to update the firmware in the electronic device, the electronic device including at least another firmware storage area that is set as active;
   detecting that the software is written correctly into the firmware storage area that is set as inactive;
   setting the other firmware storage area to be inactive;
   setting the firmware storage area to be active; and
   executing the updated firmware stored at the firmware storage area that is set as active when the electronic device enters a normal operation stage after a restart.

2. The method according to claim 1, wherein obtaining the storage address of the firmware stored on the external device comprises:
   reading information in a specific sector of the external device;
   determining whether the external device employs a specific file system according to the information in the specific sector;
   assigning a pre-determined storage address as the storage address of the software on the external device when the external device employs the specific file system; and
   assigning the storage address based on meta-information carried in the information in the specific sector when the external device does not employ the specific file system, the meta-information comprising a starting address and a data length of the software.

3. The method according to claim 1, wherein writing the software stored at the storage address of the external device into the firmware storage area in the electronic device comprises:
   replacing an existing firmware stored in the firmware storage area with the software when the firmware storage area is a single firmware storage area in the electronic device.

4. A firmware refreshing device, comprising:
   circuitry configured to:
      detect, in a starting stage, an external device in connection with an electronic device, wherein the external device is a driving free device that does not require any driver to drive the external device, and wherein detecting the external device includes:
         obtaining interface descriptor information of the external device that is in connection with the electronic device before the starting stage;
         obtaining device type information of the external device when the interface descriptor information indicates that the external device is a mass storage device; and
         determining that the external device requires no software driver based on the device type information;
      determine, based on the interface descriptor information, a driver that needs to be loaded on the electronic device for firmware updating, wherein the driver is stored in the external device;
      write software for firmware updating from the external device into the electronic device to update a firmware on the electronic device without use of the driver by:
         obtaining a storage address of the software stored on the external device;
         determining a firmware storage area in the electronic device; and
         writing the software stored at the storage address of the external device into the firmware storage area in the electronic device that is set as inactive to update the firmware in the electronic device, the electronic device including at least another firmware storage area that is set as active;
      detect that the software is written correctly into the firmware storage area that is set as inactive;
      set the other firmware storage area to be inactive;
      set the firmware storage area to be active; and
      execute the updated firmware stored at the firmware storage area that is set as active when the electronic device enters a normal operation stage after a restart.

5. The firmware refreshing device according to claim 4, wherein the circuitry is further configured to:
   read information in a specific sector of the external device;
   determine whether the external device employs a specific file system according to the information in the specific sector; and
   assign a pre-determined storage address as the storage address of the software on the external device when the external device employs the specific file system; and
   assign the storage address based on meta-information carried in the information in the specific sector when the external device does not employ the specific file system, the meta-information comprising a starting address and a data length of the software.

6. The firmware refreshing device according to claim 4, wherein the circuitry is further configured to:
   replace an existing firmware stored in the firmware storage area with the software when the firmware storage area is a single firmware storage area in the electronic device.

7. An electronic device, comprising:
   an interface configured to enable connection with the electronic device;
   a memory configured to store instructions; and
   a processor configured to execute the instructions to:

detect, in a starting stage that starts up the electronic device, an external device in connection with the electronic device via the interface, wherein the external device is a driving free device that does not require any driver to drive the external device, and wherein detecting the external device includes:
  obtaining interface descriptor information of the external device that is in connection with the electronic device before the starting stage;
  obtaining device type information of the external device when the interface descriptor information indicates that the external device is a mass storage device; and
  determining that the external device requires no software driver based on the device type information;
determine, based on the interface descriptor information, a driver that needs to be loaded on the electronic device for firmware updating, wherein the driver is stored in the external device;
write software for firmware updating from the external device into the memory to update a firmware on the electronic device without use of the driver by:
  obtaining a storage address of the software stored on the external device;
  determining a firmware storage area in the electronic device; and
  writing the software stored at the storage address of the external device into the firmware storage area in the electronic device that is set as inactive to update the firmware in the electronic device, the electronic device including at least another firmware storage area that is set as active;
detect that the software is written correctly into the firmware storage area that is set as inactive;
set the other firmware storage area to be inactive;
set the firmware storage area to be active; and
execute the updated firmware stored at the firmware storage area that is set as active when the electronic device enters a normal operation stage after a restart.

8. The electronic device according to claim 7, wherein the processor is configured to execute the instructions to:
  read information in a specific sector of the external device;
  determine whether the external device employs a specific file system according to the information in the specific sector;
  assign a pre-determined storage address as the storage address of the software on the external device when the external device employs the specific file system; and
  assign the storage address based on meta-information carried in the information in the specific sector when the external device does not employ the specific file system, the meta-information comprising a starting address and a data length of the software.

9. The electronic device according to claim 7, wherein the processor is configured to execute the instructions to:
  replace an existing firmware stored in the firmware storage area with the software when the firmware storage area is a single firmware storage area in the memory of the electronic device.

10. A non-transitory computer-readable storage medium storing instructions for causing a processor to execute operations for firmware refreshing, the operations comprising:
  detecting, by an electronic device in a starting stage that starts up the electronic device, an external device in connection with the electronic device, wherein the external device is a driving free device that does not require any driver to drive the external device, and wherein detecting the external device includes:
    obtaining interface descriptor information of the external device that is in connection with the electronic device before the starting stage;
    obtaining device type information of the external device when the interface descriptor information indicates that the external device is a mass storage device; and
    determining that the external device requires no software driver based on the device type information;
  determining, based on the interface descriptor information, a driver that needs to be loaded on the electronic device for firmware updating, wherein the driver is stored in the external device;
  writing software for firmware updating from the external device into the electronic device to update a firmware on the electronic device without use of the driver by:
    obtaining a storage address of the software stored on the external device;
    determining a firmware storage area in the electronic device; and
    writing the software stored at the storage address of the external device into the firmware storage area in the electronic device that is set as inactive to update the firmware in the electronic device, the electronic device including at least another firmware storage area that is set as active;
  detecting that the software is written correctly into the firmware storage area that is set as inactive;
  setting the other firmware storage area to be inactive;
  setting the firmware storage area to be active; and
  executing the updated firmware stored at the firmware storage area that is set as active when the electronic device enters a normal operation stage after a restart.

* * * * *